United States Patent [19]

Nightingale

[11] 4,141,501
[45] Feb. 27, 1979

[54] NOZZLES FOR GAS TURBINE ENGINES

[75] Inventor: Douglas J. Nightingale, Thornbury, England

[73] Assignee: Rolls-Royce (1971) Limited, London, England

[21] Appl. No.: 777,347

[22] Filed: Mar. 14, 1977

Related U.S. Application Data

[63] Continuation-in-part of Ser. No. 676,411, Apr. 13, 1976, Pat. No. 4,049,199.

[30] Foreign Application Priority Data

Mar. 17, 1976 [GB] United Kingdom ............... 10640/76
Aug. 4, 1976 [GB] United Kingdom ............... 32404/76
May 9, 1975 [GB] United Kingdom ............... 18889/75

[51] Int. Cl.² .......................................... B64C 15/02
[52] U.S. Cl. .............................................. 239/265.39
[58] Field of Search ............ 239/127.1, 127.3, 265.19, 239/265.33, 265.37, 265.39, 265.41; 60/228, 232, 271; 244/201, 215, 216, 217

[56] References Cited

U.S. PATENT DOCUMENTS

| | | | |
|---|---|---|---|
| 2,870,600 | 1/1959 | Brown | 239/265.41 X |
| 2,910,829 | 11/1959 | Meyer | 239/265.39 X |
| 2,995,010 | 8/1961 | Arscott | 239/127.3 |
| 3,004,385 | 10/1961 | Spears, Jr. et al. | 239/265.41 |
| 3,386,248 | 6/1968 | Pike et al. | 239/265.33 X |
| 3,599,875 | 8/1971 | Wynosky et al. | 239/265.41 |
| 3,778,009 | 12/1973 | Jones | 242/216 |
| 3,814,325 | 6/1974 | McCardle, Jr. et al. | 239/265.39 |

Primary Examiner—Robert B. Reeves
Assistant Examiner—Andres Kashnikow
Attorney, Agent, or Firm—Stevens, Davis, Miller & Mosher

[57] ABSTRACT

A convergent divergent exhaust nozzle for a jet engine, in which a circumferential array of interdigitated master and slave petals are axially movable along an arcuate track. Each petal is divided by a hinge into upstream and downstream portions and the downstream portions are pivotable about the hinges to vary the divergent flare angle of the nozzle. The master petals are supported on the arcuate tracks by means of a pair of axially spaced apart rollers bearing on opposite surfaces of the tracks. Gas pressure on the petals is used to reduce the force necessary to operate the nozzle.

11 Claims, 16 Drawing Figures

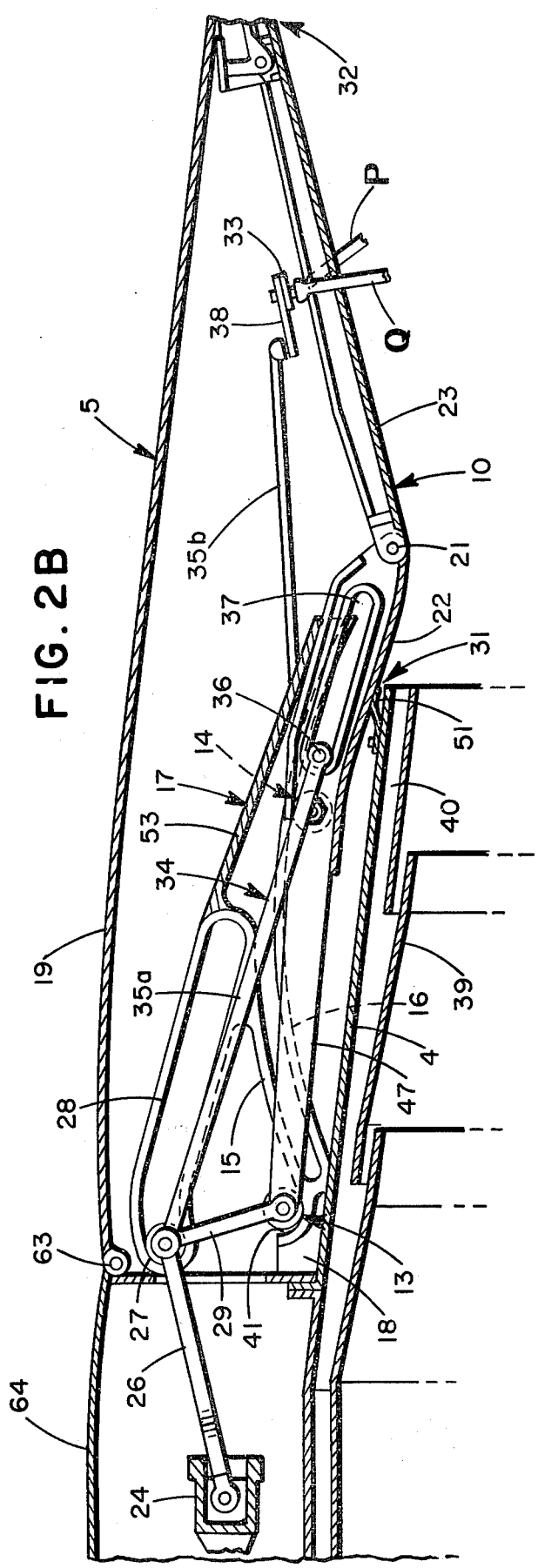
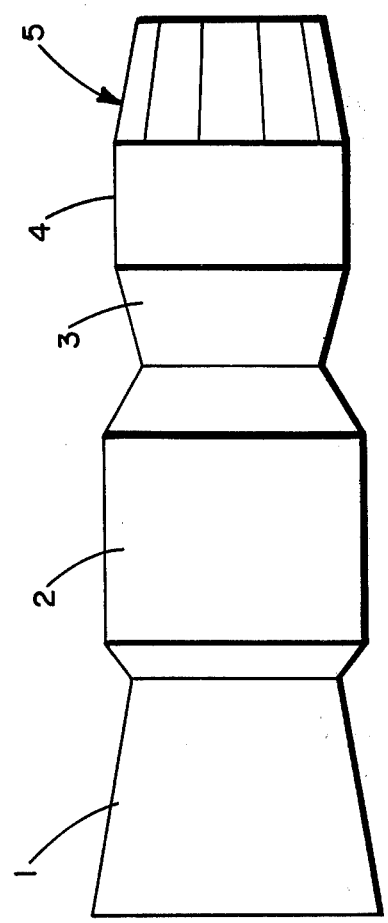

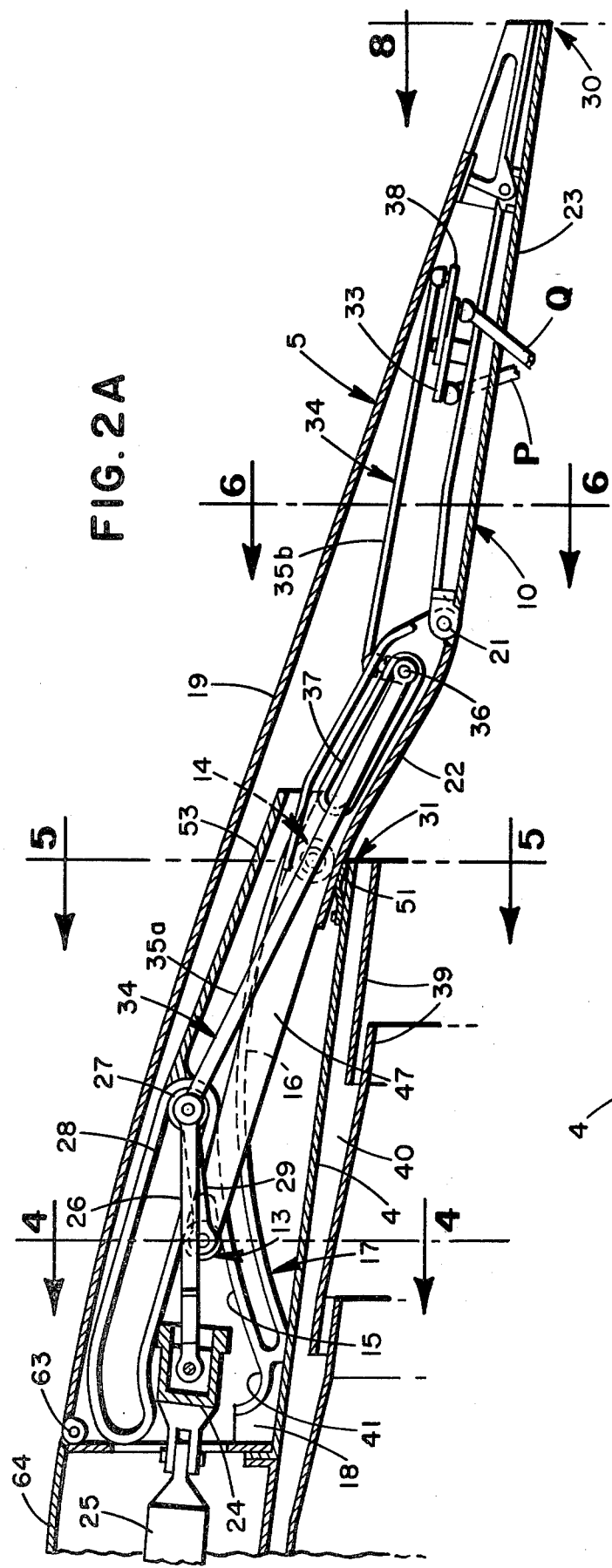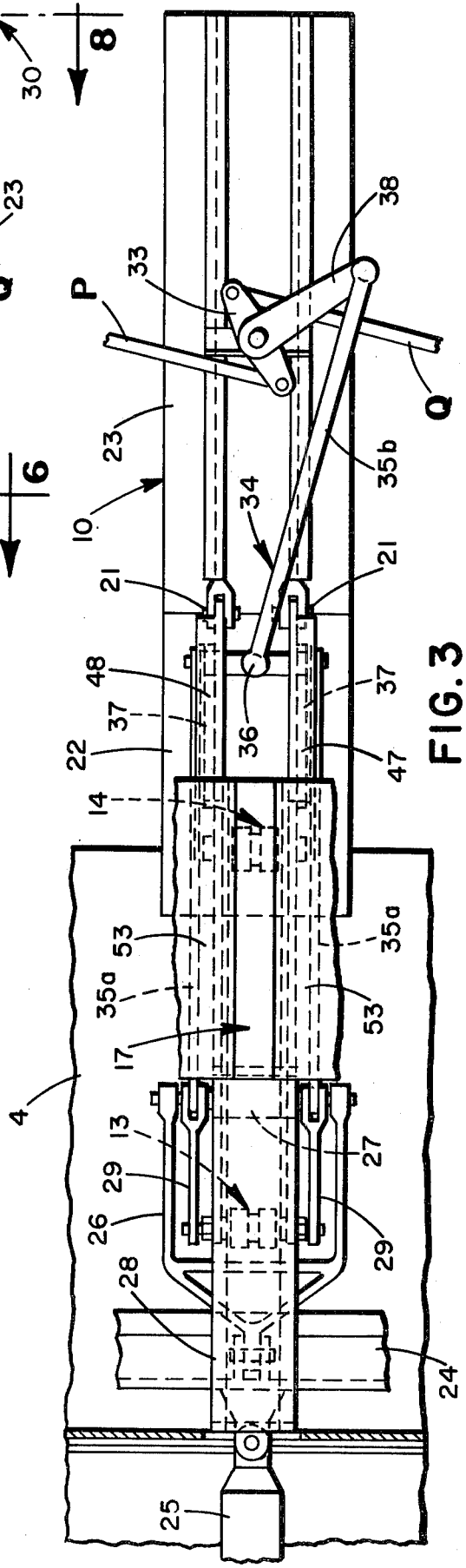

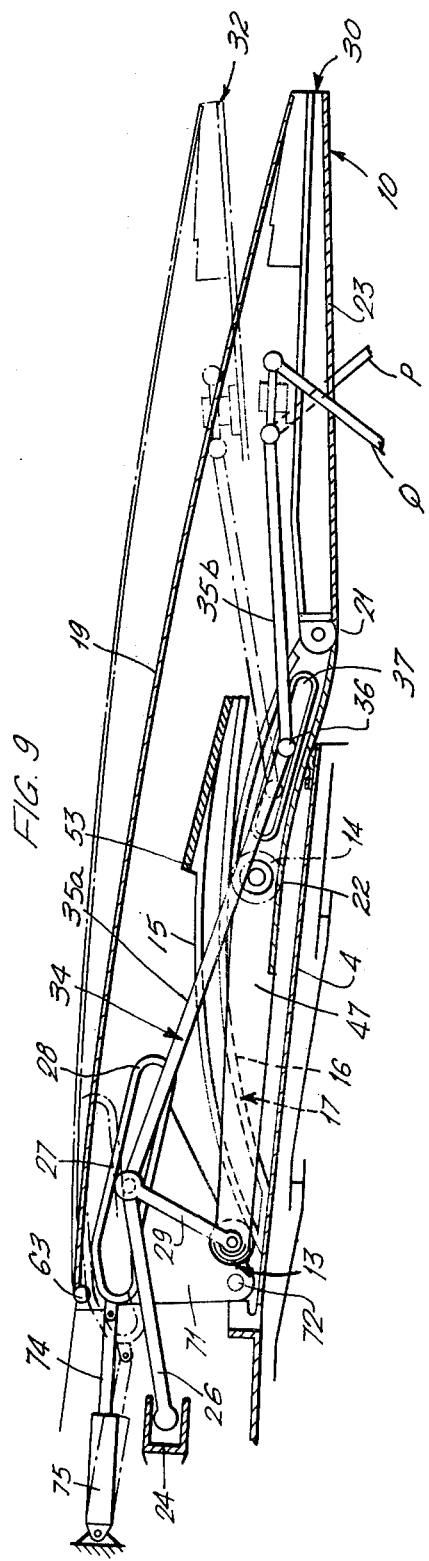

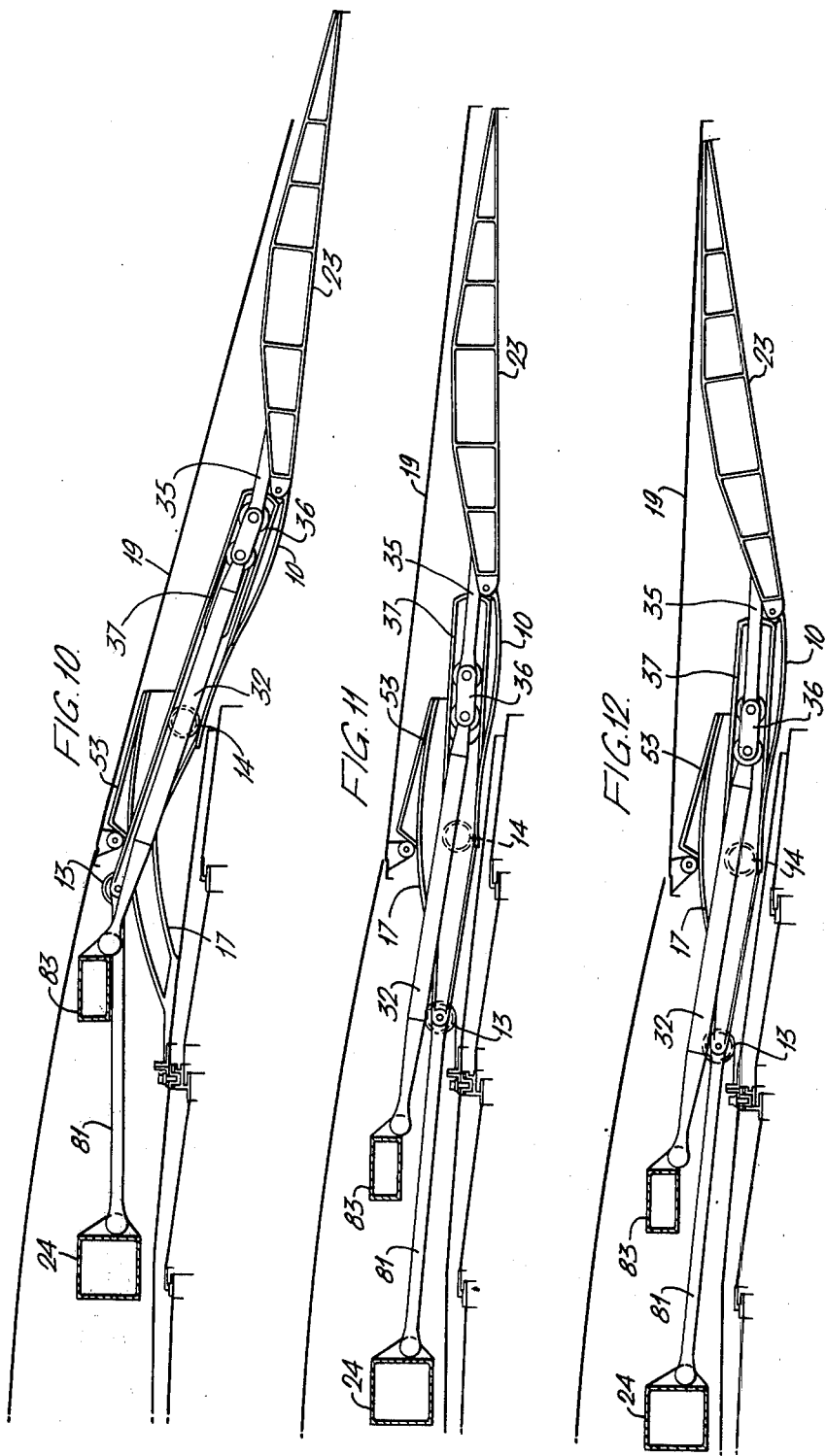

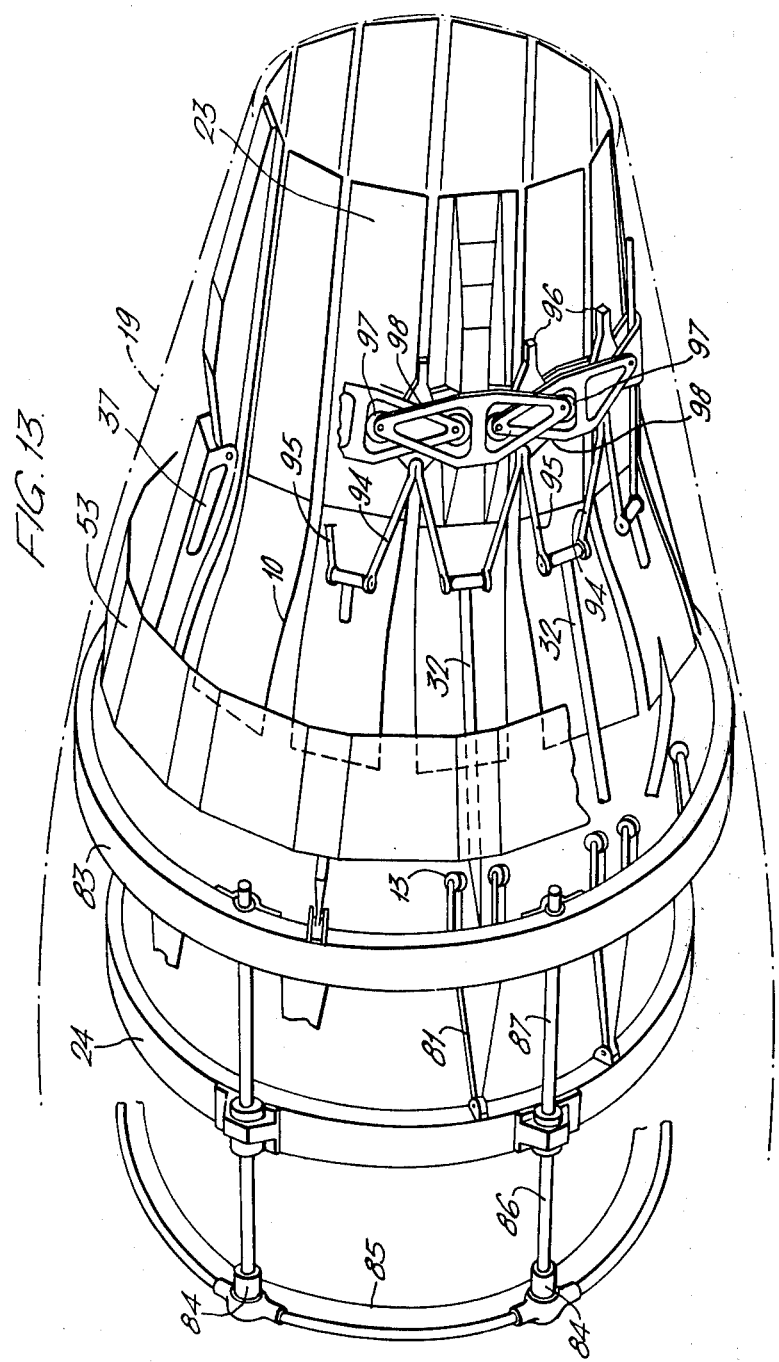

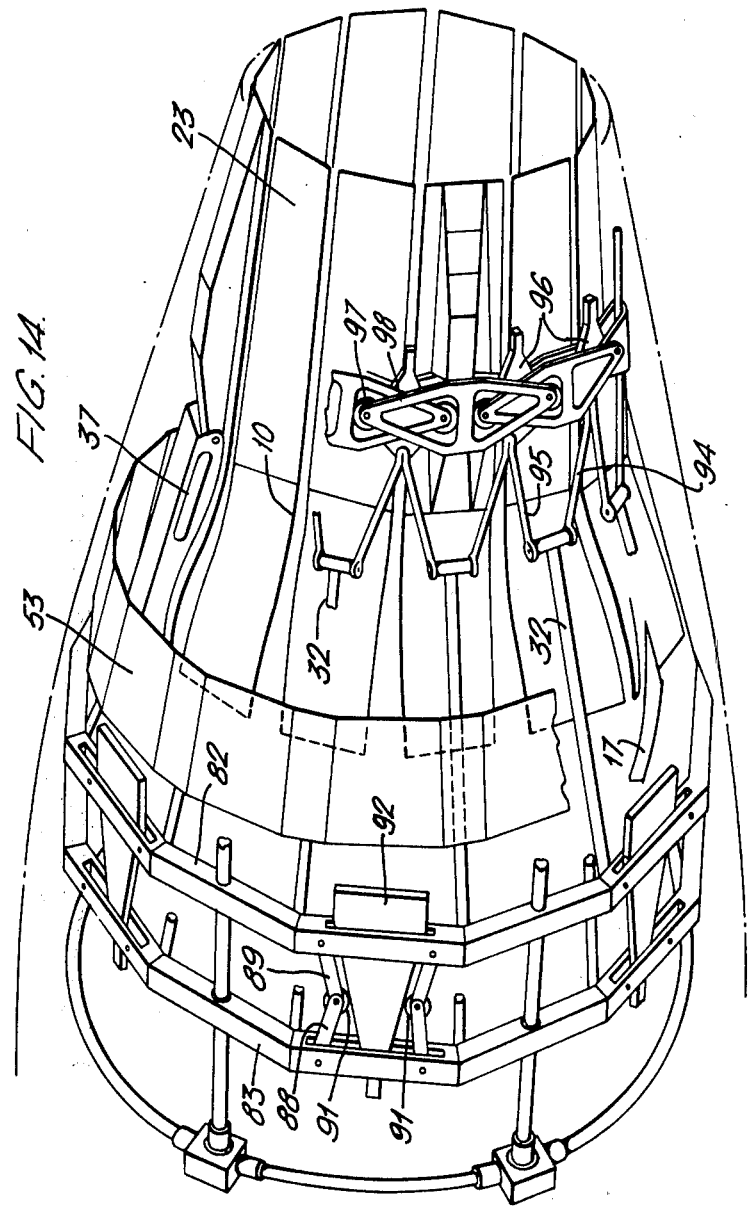

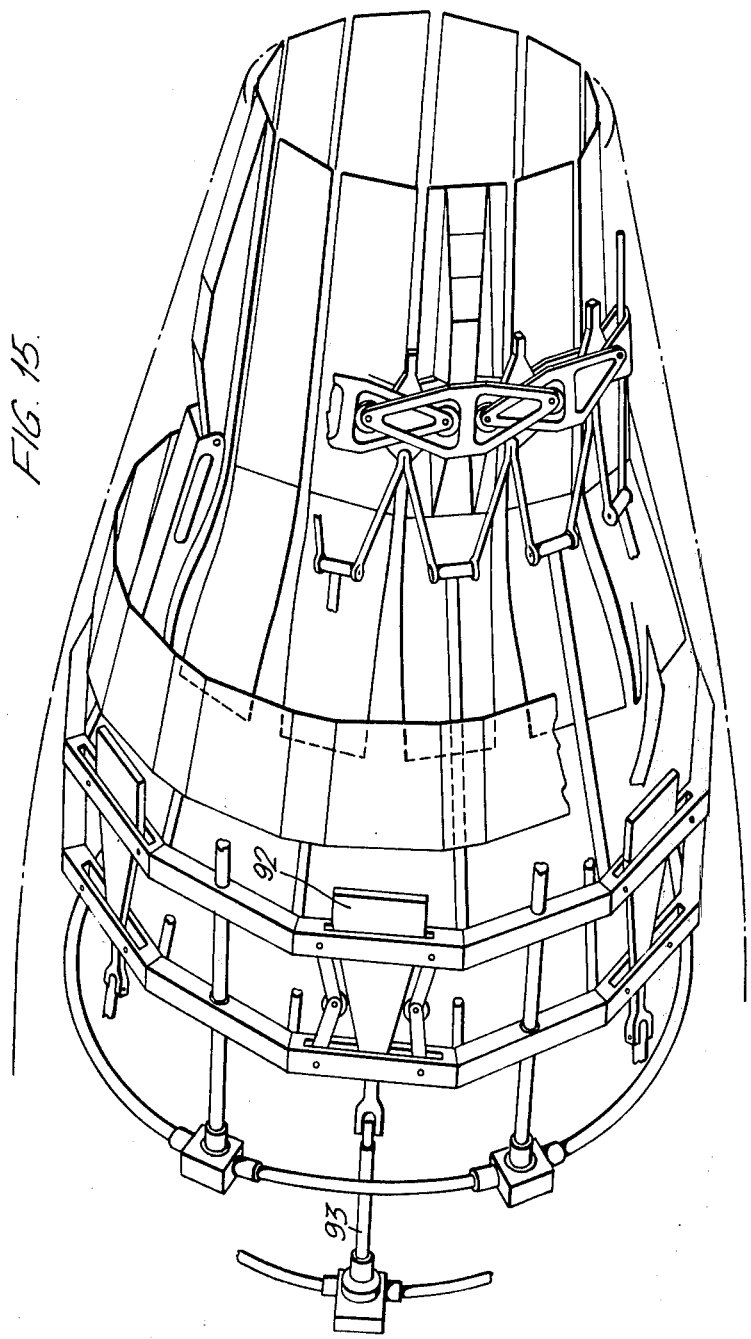

NOZZLES FOR GAS TURBINE ENGINES

This is a continuation-in-part of Ser. No. 676,411 filed Apr. 13, 1976, now U.S. Pat. No. 4,049,199.

The present invention relates to nozzles for gas turbine engines and has particular reference to a variable area convergent-divergent discharge nozzle suitable for use with engines capable of propelling aircraft at supersonic speeds.

Variable area convergent-divergent nozzles are known in the art which comprise a circumferential array of axially extending nozzle petals arranged around the circumference of the gas discharge duct of a gas turbine engine. The nozzle petals are alternately master petals, which are directly actuated, inter-digitated with slave petals which follow the movement of the master petals. The petals are connected together either through a slotted or an overlapping arrangement whereby relative movement of the master and slave petals is possible to allow for area variation of the nozzle.

It is a continuing problem in the design of final discharge nozzles, for gas turbine engines, in particular in the design of nozzles which can be changed from a convergent to a convergent-divergent configuration, to provide relatively increasingly lighter nozzles of relatively economic construction which require relatively low actuating loads for their operation. In our copending U.K. patent application numbered 18889/75 and entitled "Improvements in Nozzles for Gas Turbine Engines" corresponding to U.S. application Serial Number 676,411 filed Apr. 13, 1976 there is described and claimed a variable area nozzle for a gas turbine engine comprising a circumferential array of nozzle petals arranged about the discharge opening of a jet pipe, there being in respect of at least some nozzle petals respective curved guide tracks mounted on the jet pipe and respective pairs of axially spaced apart rollers mounted on these nozzle petals wherein the upstream roller of each pair runs on a radially outer surface of one of the curved tracks and the downstream roller runs on a radially inner surface of the curved track and wherein all of said rollers are simultaneously movable along their respective curved tracks thereby to cause movement of the nozzle petals to vary the nozzle outlet area.

Preferably for this nozzle the circumferential array of nozzle petals comprises interdigitated master and slave petals in which only the master petals are provided with said respective pairs of rollers and the movement of the master petals results in a corresponding movement of the slave petals.

In one embodiment of the nozzle the curved tracks are inter-connected by an arrangement of members surrounding the jet pipe whereby radially outward loads exerted on the curved tracks by the downstream rollers are borne at least partially by tension in said members.

In a further embodiment fairing flaps are supported from structure upstream of the discharge opening of the nozzle whereby the downstream ends of the fairing flaps are in sliding contact with the downstream end of the discharge nozzle and the fairing flaps are interdigitated so that a smooth profile is achieved between structure surrounding the jet pipe of the engine and the discharge opening of the nozzle.

This nozzle configuration described as above, and in the previous patent application allows, by suitable curving of the nozzle petals and the curved tracks, both the nozzle throat area and the final divergent flare angle of the nozzle to be simultaneously varied. This arrangement is satisfactory for use with subsonic and supersonic aircraft for operation up to speeds of about Mach 1.2, but for higher speeds of operation significant performance gains are known to be available if the divergent flare angle of the convergent divergent nozzle can be varied independently of the nozzle throat area.

The best aerodynamic performance of the nozzle is achievable when the divergent flare angle of the nozzle can be varied irrespective of the particular nozzle throat area that is chosen. This arrangement however, tends to complicate the nozzle and a satisfactory practical compromise between complexity and nozzle performance is achieved by relating the divergent flare angle to the nozzle throat area at all values up to the maximum nozzle throat area and only allowing the divergent flare angle to be further variable when the maximum throat area has been reached.

Certain nozzles have been constructed having this latter capability but have been relatively heavy and complex, have required separate operating linkages for varying the nozzles throat area and the divergent flare angle, have incurred relatively large actuating loads and have required considerable space to accommodate the various components of nozzle structure. The increased space necessary to accommodate prior art nozzle structures has resulted in wider engine nozzles than is desirable and this has in turn led to a compromise in the shape of the fairing flaps resulting at certain speeds in breakaway of the flow around the outside of the nozzle with attendant disadvantages. The present invention, which is a modification of the earlier invention seeks to provide a means of allowing the aforesaid variation of the divergent flare angle of a convergent-divergent nozzle and of at least reducing the magnitude of the problems associated with prior art nozzles.

According to the present invention there is provided a variable area nozzle for a gas turbine engine comprising a circumferential array of nozzle petals, including certain master petals, arranged about the discharge opening of a jet pipe, there being in respect of each said master petal an upstream roller and a downstream roller the rollers being axially spaced apart and engaging respective radially outwardly facing and radially inwardly facing guide track surfaces fixed relative to the jet pipe and arranged for changing the inclinations of the petals relative to the jet pipe an operation of means for simultaneously moving the petals axially along the guide track surfaces the nozzle being further characterised by hinges disposed between upstream and downstream portions of the nozzle petals, the hinges being located downstream of the rollers, and by means for pivoting the downstream nozzle petal portions about the hinges to vary their inclination to the upstream nozzle petal portions thereby to vary the divergent flare angle of the nozzle.

Preferably said means for pivoting the downstream nozzle petal portions and the means operable to move the nozzle petals axially along the guide surfaces are mechanically connected whereby gas loads operative on the downstream flap portions reduce the power required for nozzle throat area variation.

Nozzles constructed in this way allow the attainment of many desirable advantages.

The disposition of the guide track surfaces which allows the inclination of the nozzle petals to change simultaneously with axial movement thereof means that full area variation of the nozzle can take place for relatively short axial movement of the nozzle petals. The disposition of the rollers means that the gas loads operating on the nozzle petals are largely reacted by contact loads on the guide track surfaces, which can then conveniently be borne by tension in a polygonal skin interconnecting at least the radially inwardly facing guide track surfaces.

The relative disposition of the rollers and guide track surfaces necessary to the operation of the nozzle means that the operating mechanism is required to carry only relatively light operating loads. The operating mechanism needed is itself relatively lightly loaded because the light operating loads combined with the short operating movement of the nozzle means that the work supplied in operating the nozzle is significantly relatively reduced.

The interconnection between the operating mechanism for the upstream and downstream petal portions allows gas pressure operating on the downstream petal portions to be used to counteract the forces necessary to move the upstream petal portions and to counteract the dragging forces caused by flow through the nozzle from trying to pull the petals in a downstream direction.

The general disposition of the various elements of the nozzle can conveniently be disposed around the jet pipe of the nozzle so that the width of the nozzle is kept relatively small thus simplifying the problem of fairing the nozzle into other engine or aircraft structure.

The disposition of the nozzle operating elements means they are advantageously shielded from hot exhaust gases which allows them to be made from relatively lightweight materials.

Preferably the means for pivoting the downstream nozzle petal portions comprises a plurality of struts connected by their downstream ends to the downstream petal portions and by their upstream ends to further rollers running on profiled guide tracks and wherein nozzle operating movement applied to the further rollers is also applied to said upstream rollers by further struts connecting the further rollers with the upstream rollers.

The relative movements of the upstream and downstream nozzle portions, which control the overall nozzle configuration, are thus dependent on the profile and orientation of the respective guide tracks.

In one embodiment there is provided a stop capable of limiting axial movement of the upstream rollers and the profiled guide tracks permit further movement of the further rollers to produce only variation in the divergent flare angle of the downstream nozzle portions once the maximum nozzle throat area has been reached.

In a preferred embodiment the means for simultaneously moving the petals axially along the guide track surfaces and the means for pivoting the downstream nozzle petal portions comprise a pair of axially spaced apart axially translatable unison rings each connected by ties to the upstream and downstream nozzle petal portions respectively and means for producing differential axial movement of the two unison rings.

Said means for producing differential axial movement may comprise either a series of screw jacks having two axially spaced apart screw threaded portions of differential pitch. In an alternative form of the invention said differential movement is produced by introducing generally wedge shaped members at intervals around the unison rings and interconnecting the unison rings by a series of pairs of struts, each pair of struts being pivoted to the unison rings by their one ends and pivoted together at a roller by their other ends, the rollers bearing on the wedge shaped members thereby producing differential movement of the rings on operating movement applied to the downstream unison ring.

By the above described embodiments in which only a single operating linkage is used to vary the nozzle geometry it is possible to vary the relationship between the nozzle throat area and the divergent flare angle of the nozzle but only according to a predetermined regime controlled by the detailed mechanical arrangement of the nozzle.

By the addition of a further operating mechanism to the above embodiments it is possible to vary the divergent flare angle irrespective of the nozzle throat area setting.

Thus in a further embodiment the axial positions of the two unison rings are independently controlled by the provision of two sets of screw jacks.

In a modification the wedge shaped members disposed between the unison rings are themselves axially movable by an independent screw jack system.

In a further modification in which the position of the downstream nozzle petal portions is controlled by the said further rollers running on profiled guide tracks the orientation of the further profiled guide tracks with respect to said curved track surfaces is adjustable whereby the divergent flare angle of the nozzle may be altered independently of the setting of the nozzle throat area.

Advantageously the said orientation is adjustable by pivotally supporting the further profiled guide tracks about respective centres lying on a circle concentric with the jet pipe. In this manner the actuating loads for adjusting the orientation of the further profiled guide tracks are kept relatively low.

Embodiments of the invention will now be described by way of example only with reference to the following drawings in which, FIG. 1 is a diagrammatic illustration of a gas turbine engine embodying a variable area nozzle of the present invention, FIG. 2A is a sectional view through a master nozzle petal of the engine of FIG. 1 in the convergent position of the nozzle, FIG. 2B is an axial sectional view similar to FIG. 2A but showing the nozzle in its convergent - divergent mode;

FIG. 3 is a plan view of FIGS. 2A and 2B illustrating details of the operating linkage, of a master petal; with the fairing flap 19 removed;

FIG. 9 is a sectional view similar to FIGS. 2A and 2B of a modified nozzle construction.

FIG. 10 is a longitudinal section through a master petal of an alternative nozzle construction shown in the convergent position, FIGS. 11, 12 illustrate the nozzle of FIG. 10 in intermediate and convergent-divergent operating positions respectively, FIG. 13 is an isometric view of the nozzle of FIG. 10 illustrating an operating mechanism.

FIG. 14 is an isometric view similar to FIG. 13 showing an alternative nozzle operating mechanism, FIG. 15 is a further isometric view similar to FIG. 13 showing a further alternative nozzle operating mechanism.

Figure 4:
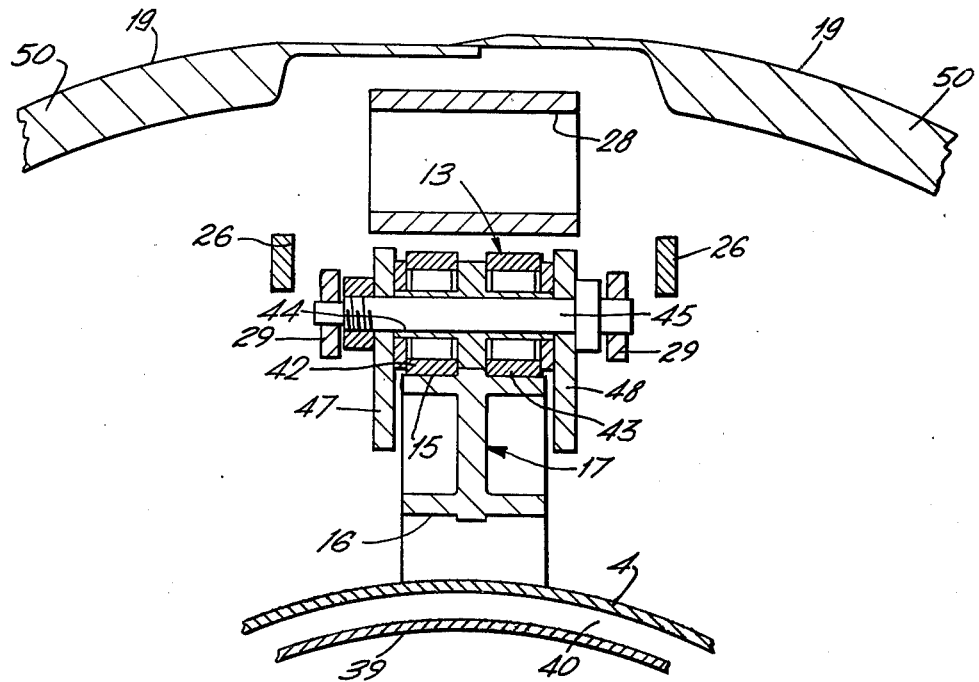
FIG. 4 is a section on the line 4 — 4 of FIG. 2A to an enlarged scale.

Referring now to FIG. 1, a gas turbine engine comprises a compressor 1, combustion equipment 2, a turbine 3 and a jet pipe 4 terminating in a propulsion nozzle 5.

In FIGS. 2A and 2B there are shown sectional view through one master petal 10 of a circumferential array of petals arranged about the periphery of the jet pipe 4 and forming the propulsion nozzle 5. Attached to each master petal is an upstream roller 13, and a downstream roller 14 which engage respective radially outwardly and inwardly facing guide track surfaces 15,16 which are formed on opposite sides of a curved beam 17, fixedly mounted on the jet pipe 4 by a flange 18. (Beams 17 are secured to the outside surface of jet pipe 4.)

The complete nozzle has twelve master petals and twelve interdigitated slave petals. The nozzle petals and their associated operating mechanism are enclosed by a circumferential array of overlapping fairing flaps 19 which will be later described in further detail. There is provided one curved beam 17 for each master petal, and each beam is of the same radius of curvature and all the centres of curvature of the curved beams lie equally spaced apart on a circle formed about the centre line of the jet pipe.

The master nozzle petals, and similarly the slave nozzle petals are divided by hinges 21 into upstream and downstream nozzle petal portions 22,23 respectively which allows the divergent flare angle of the nozzle to be varied as required.

In operation the master nozzle petals are moved simultaneously axially along the guide track surfaces 15,16 by means of operating movement applied to a jack unison ring 24 (Seen in FIG. 13) from a screw jack 25. A axial movement of the ring 24 is applied to the master nozzle petals as can be seen in more detail by referring also to FIG. 3 via links 26 which pull or push on rollers 27 constrained to move in a fixed guide track 28 which is integral with beam 17 and plates 53. Movement of the rollers 27 is communicated to the upstream rollers 13 via parallel struts 29. This causes the master nozzle petals 10 to move along the guide tracks 15,16 between a convergent configuration in which the nozzle throat is formed at the final discharge and 30 of the nozzle FIG. 2A and a convergent-divergent configuration in which the nozzle throat is formed at the end of the discharge opening 31 of the jet pipe 4 FIG. 2B.

The precise positioning of the downstream nozzle petal portions 23 is controlled by linkages 34 which operate a series of bellcranks 33 located on the downstream flap portions 23 and pivoting about an axis that is perpendicular to petals 23. Connecting links P and Q, see FIG. 3, interconnect alternate downstream flap portions to synchronise their movement.

The linkages 34 each comprise parallel upstream struts 35a and a downstream strut 35b pivotally connected together at 36 and the pivot 36 is constrained to move in slots 37 formed in plates 47, 48 integral with the upstream flap portion 22 of master petal 10. The downstream struts 35b are connected to levers 38 for operating the bellcranks 33. In operation gas loads on the downstream petal portions produce reaction forces in the struts 35a and 35b which are communicated to the operating mechanism via the rollers 27 and serve to reduce the force required from the screw jacks 25.

The precise profile and orientation of the guide tracks 28 in relation to the disposition of the guide track surfaces 15,16 controls the relative movements of the upstream and downstream nozzle petal portions. In particular it will be noted that after a first range of axial movement of the nozzle petals the upstream rollers 13 will abut stops 41. When this occurs the nozzle is at its maximum throat area setting and further axial movement in a forward or upstream direction of the jack ring 24 will cause the rollers 27 to move along the slots 28 pulling on linkage 34 and petal portion 23 and thus varying the divergent flare angle of the nozzle. The maximum flare angle is shown in FIG. 2B.

At the end of the jet pipe 4 there is provided an annular seal 51 which bears on the master and slave petals and substantially prevents leakage of propulsive gases.

A reheat liner 39 is maintained in a concentric position within the jet pipe 4 and in known manner is cooled by a flow of relatively cool air which flows along the annular passage 40 formed between the reheat liner 39 and the jet pipe 4. This flow of cooling air also cools the master and slave petals.

Figure 5:
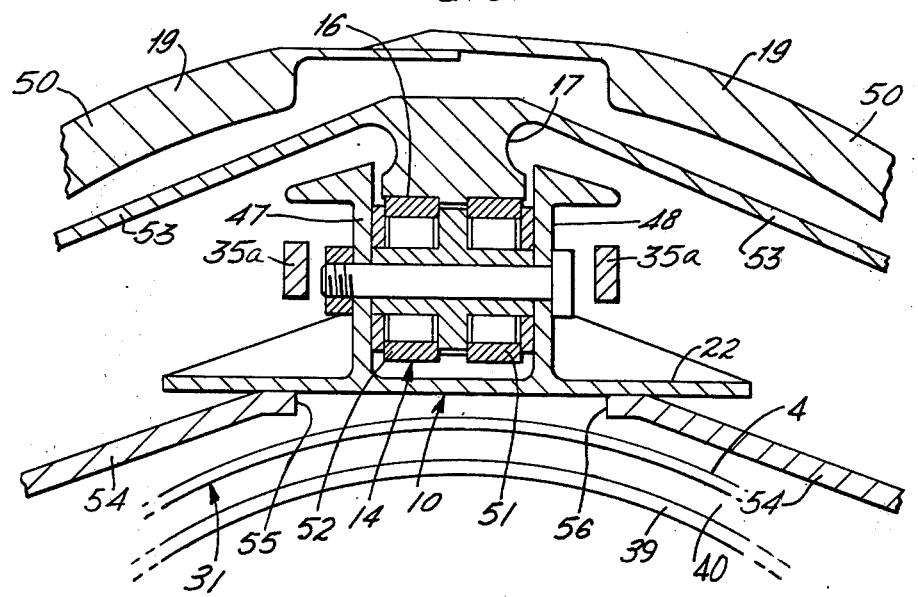
FIG. 5 is a section on the line 5 — 5 of FIG. 2A to an enlarged scale.

Turning now to FIGS. 4, 5 details of the upstream and downstream roller assemblies associated with master petals 10 will be explained. In particular in FIG. 4 it will be seen that the upstream roller 13 comprises a pair of roller bearings 42,43 mounted via an inner race 44 on a cross shaft 45. The shaft 45 is supported in side plates 47, 48 which are part of portion 22 of the master petal and serve also to support the downstream roller 14 as shown in FIG. 5. The downstream roller comprises a pair of roller bearings 51, 52 and is constructed in like fashion to the upstream roller 13. Gas pressure within the nozzle acting on the master petals presses the downstream rollers 14 against the radially inwardly facing guide track surfaces 16 and the upstream rollers 13 against the radially outwardly facing guide track surfaces 15 of the curved beams 17 and there is a net radially outward load applied to the curved beams. This radially outward load, is borne by tension in plates 53 integral with beams 17 and forming a polygonal skin which connects the twelve curved beams together around the periphery of the nozzle as seen in FIG. 5.

To either side of the master petal 10 can be seen the interdigitated slave petals 54 whose side edges 55, 56 can slide relative to the master petal 10 to permit variation of the nozzle exit area. The slave petals like the master petals are divided by hinges into upstream and downstream portions and the downstream portions are connected to the outer fairing flaps 19 as can be seen in more detail from FIGS. 6 and 7.

Figure 6:
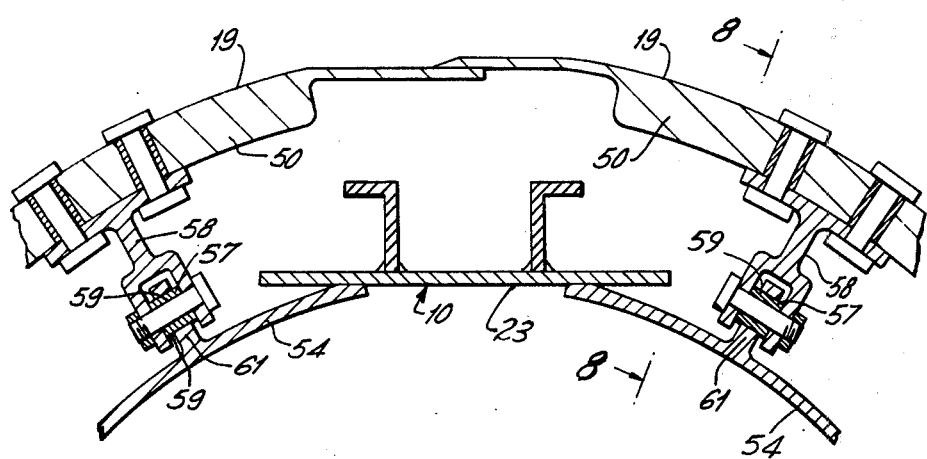
FIG. 6 is a section on the line 6 — 6 of FIG. 2A to an enlarged scale.
Figure 8:
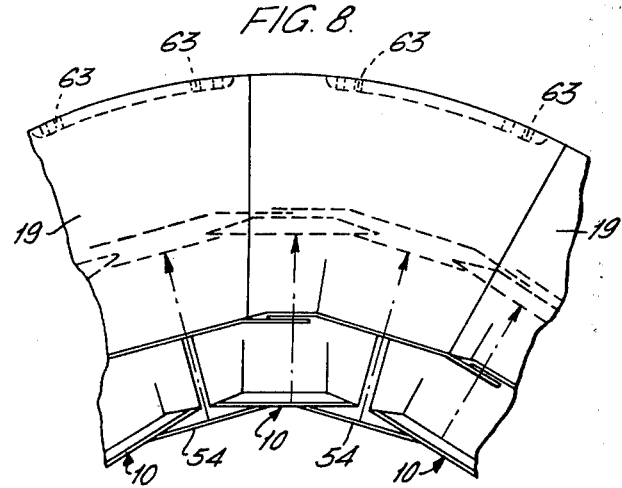
FIG. 8 is an end elevation of the discharge opening of the nozzle taken on the line 8 — 8 of FIG. 2A; with the divergent position of the nozzle petals shown by dot-dash lines.
Figure 7:
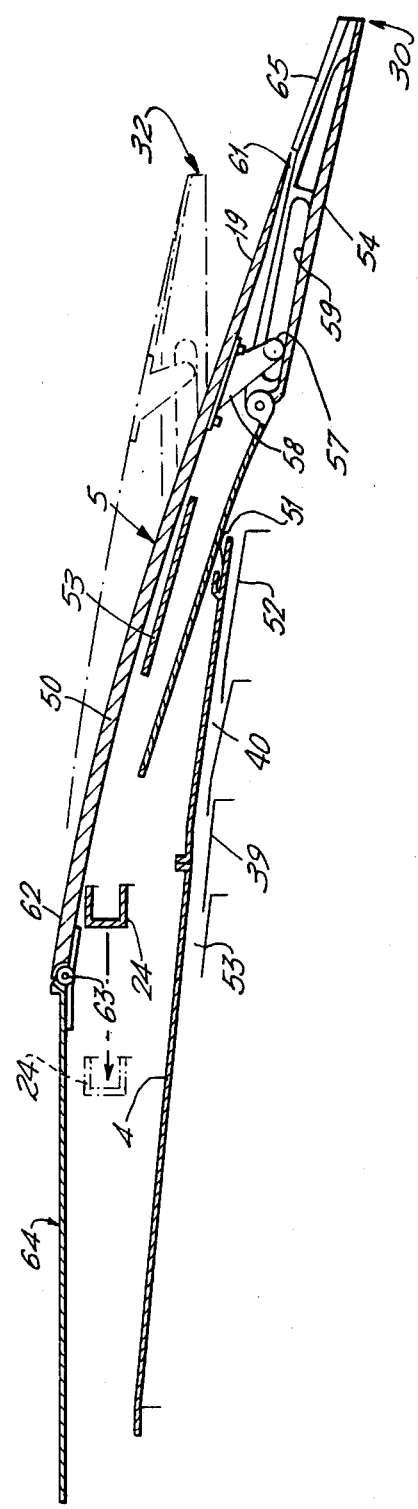
FIG. 7 is a sectional view through a slave nozzle petal, taken on line 7 — 7 of FIG. 6

From FIGS. 6 and 7 it will be understood that rollers 57 supported by respective yokes 58 attached to the fairing flaps 19 run in respective inclined grooves 59 cut in a radial outwardly extending flanges 61 attached one to each slave petal 54. In this manner the slave petals 54 move together with the fairing flaps 19 which themselves move as the master petals 10 are actuated.

The fairing flaps, which can be further seen in FIG. 7 and of which there are twenty four in the complete nozzle, are each connected at their upstream ends 62 by hinges 63 to structure 64 which surrounds the jet pipe 4.

This structure may be either aircraft or engine structure and the fairing flaps allow the outer surface of the nozzle to blend smoothly with said structure 64 and thus to coverage in a conventional boat tail angle for the avoidance of base drag. At their downstream ends the fairing flaps surround and are flush with the outer surface of the master and slave petals in the convergent position of the nozzle but lift and slide over the outer periphery 65 of the petals during operation of the nozzle until in the convergent-divergent configuration the downstream ends of the fairing flaps coincide with the downstream ends of the petals.

The fairing flaps 19 may be made from a lightweight honeycomb material (not illustrated) in the areas 50 of the flaps.

Whilst in this embodiment the slave petals have been shown to be operated by the fairing flaps 19 it is equally possible to use other known methods of operating them from the master petals.

In a modification of the above described nozzle shown in FIG. 9 two distinct operating mechanisms for the upstream and downstream petal portions of the master petal 10 are utilised in order to vary the divergent flare angle of the nozzle for any particular nozzle throat area setting whilst retaining the benefits of the compactness and lightness of the basic nozzle configuration.

These benefits are achieved by divorcing the further profiled guide tracks 28 from the curved beams 17 and mounting them, via a plate 71 to respective pivot axes 72 which are disposed on a circle concentric with the jet pipe 4 and secured thereto. Providing the pivot axes 72 are not concentric with the centre of curvature of the guide tracks 28 pivoting of the guide tracks, which is effected by hydraulic cylinder 75 and piston rod 74 will cause the divergent flare angle of the nozzle to vary.

As the roller 27 is connected to the upstream roller 13 by struts 29 adjustment of the orientation of the guide track 28 by hydraulic ram 74, 75 will lead to simultaneous movement of the roller 13 on the curved guide track 15. This will then result in simultaneous adjustment of the throat area of the nozzle and change of the divergent flare angle. Should this be unacceptable it is necessary to provide a feedback of the position of nozzle throttle area which can be used in conjunction with the nozzle throat area and divergence flare angle to trim the nozzle.

The feedback system whilst not specifically illustrated as will be readily appreciated, can conveniently be related to the axial position of the jack ring 24 and the angular orientation of the curved guide tracks, or to some other readily measured parameter representative of the actual nozzle setting.

Turning now to FIGS. 10, 11, 12 three operating positions of an alternative nozzle construction are illustrated in which like numerals refer to parts common to the earlier embodiments.

In the Figs. it will be noted as before that master petals 10 are provided with upstream and downstream rollers 13 and 14 which run respectively radially outwardly and inwardly on guide track surfaces.

In distinction to the previous embodiment the upstream rollers are moved directly by ties 81. The linkages 34 for the downstream petal portions 23 are directly connected to a second jack ring 83 and differential axial movement between the jack rings 24 and 83 is used to vary the nozzle throat area and the divergent flare angle of the nozzle.

As before slave petals are interdigitated with the master petals and the downstream slave petal portions are connected to the fairing flaps 19 for movement together therewith.

The differential axial movement between the two jack rings may be produced in a variety of ways in particular in FIG. 13 an isometric view of the nozzle illustrates the use of a plurality of ball screw jacks 84 to produce the necessary movement. The ball screw jacks, of which there are six around the nozzle are anchored to fixed structure 85, and have two axially separated screw threaded portions 86,87 of differing pitch.

With this arrangement rotation of the ball screws produces differential movement of the two unison rings and the difference in pitch regulates the relationship between the nozzle throat area and the final divergent flare angle of the nozzle.

In the modification illustrated in FIG. 14 it will be noted that the ball screw jacks 84 operate only on the upstream unison ring 83 and that the downstream unison ring 82 is connected to the upstream unison ring via pairs of struts 88,89.

The struts 88,89 are pivoted together by their one ends at rollers 91 and are pivoted by their other ends to the unison rings 82,83 respectively.

Interposed between adjacent pairs of rollers 91 are fixed wedge shaped members 92 and in operation the loads prevailing on the nozzle cause the rollers to be pressed against the wedge shaped members. Thus as the downstream unison rings position is adjusted the rollers 91 and wedge shaped members co-operate to differentially adjust the position of the upstream unison ring. The profile of the wedge controls the relative settings of the nozzle throat area and the divergent flare angle.

By the modification of FIG. 15 the positions of the wedge shaped members 91 are adjustable by a separate set of ball screw jacks 93 which enables the divergent flare angle of the nozzle to be varied for any particular nozzle throat area setting.

The positioning of the downstream flap portions can be achieved by various methods other than the bell cranks illustrated in FIGS. 1 - 9. One particularly useful alternative is illustrated in FIGS. 13, 14, 15 from which it can be seen that the linkage 34 is modified by replacing strut 35 with a pair of diverging struts 94,95. Struts 94,95 pair with equivalent diverging struts from adjacent linkages 34 and serve to position a circumferential array of wedge cams 96. Rollers 97 supported from arms 98 on the downstream petal portions bear on the profiled sides of the wedge cams and thus axial movement of the wedge cams produced in response to actuating movement of the linkage varies the divergent flare angle of the nozzle.

It will be understood that by profiling the wedge cams the relationship between the nozzle throat area and the divergent flare angle of the nozzle can readily be varied.

It will be apparent that many variations may be made to the nozzle construction and in particular that wilst the radially inwardly and outwardly facing guide track surfaces have been illustrated as being formed on either side of a curved beam they could well be separate constructions and indeed their profiles can be varied to suit the particular requirements of a particular nozzle.

I claim:

1. A variable area nozzle for a gas turbine engine comprising a circumferential array of nozzle petals, including certain master petals, arranged about the discharge opening of a jet pipe, there being in respect of each said master petal an upstream roller and a downstream roller, the rollers being axially spaced apart and engaging respective radially outwardly facing and radially inwardly facing guide track surfaces fixed relative to the jet pipe and arranged for changing the inclinations of the petals relative to the jet pipe on operation of means for simultaneously moving the petals axially along the guide track surfaces the nozzle being further characterised by hinges disposed between upstream and downstream portions of the nozzle petals, the hinges being located downstream of the rollers and by means for pivoting the downstream nozzle petal portions about the hinges to vary their inclination to the upstream nozzle portions thereby to vary the divergent flare angle of the nozzle.

2. A nozzle according to claim 1 and in which the means for pivoting the downstream nozzle petal portions and the means operable to move the nozzle petals axially along the guide surfaces are mechanically connected whereby gas loads operative on the downstream flap portions reduce the power required for nozzle throat area variation.

3. A nozzle according to claim 1 comprising further rollers, a further profiled guide track for said further rollers, and struts connecting the downstream nozzle petal portions to said further rollers, other struts connecting the further rollers to said upstream rollers and a jack for pulling said further rollers along said further guide tracks.

4. A nozzle according to claim 3 and in which said further profiled guide tracks are pivotally connected to a fixed part of the engine and in which a further jack is provided for pivotally displacing the profiled guide tracks.

5. A nozzle according to claim 1 in which the means for moving the petals axially includes a first unison ring, a plurality of struts connected to a first unison ring and a second unison ring for moving the nozzle petals along the guide track surfaces and a mechanical coupling between said two unison rings for producing differential movement thereof.

6. A nozzle according to claim 5 and in which the mechanical coupling between the two unison rings comprises a series of ball screw jacks having two screw threaded portions of differential pitch each engaging a respective unison ring.

7. A nozzle according to claim 5 and in which the mechanical coupling between the two unison rings comprises a plurality of pairs of struts each strut of each pair of struts being pivotally connected by its one end to a respective unison ring and by its other end to the other strut of the pair and each pair of struts supporting at their common pivotal connection a roller and adjacent pairs of rollers bearing on opposite surfaces of a wedge shaped member.

8. A nozzle according to claim 7 and in which separate jack means collectively axially displace said wedge shaped members.

9. A nozzle according to claim 1 in which the master petals are interdigitated with slave petals, and the slave petals have downstream portions pivotally connected to upstream portions and are connected to external nozzle fairing flaps for movement together therewith.

10. A nozzle according to claim 1 in which the downstream nozzle petal portions of the master petals are interconnected for simultaneous movement by a series of bell cranks.

11. A nozzle according to claim 1 in which said means for pivoting the downstream nozzle petal portions comprises a plurality of struts connected to produce axial movement of a circumferential array of generally wedge-shaped cams and there being one cam for each alternate downstream petal portion and each interdigitated downstream petal portion being provided with a pair of arms each arm straddling a respective adjacent cam and bearing on a cam surface therof.

* * * * *

UNITED STATES PATENT AND TRADEMARK OFFICE
CERTIFICATE OF CORRECTION

PATENT NO. : 4,141,501

DATED : February 27, 1979

INVENTOR(S) : Douglas John NIGHTINGALE

It is certified that error appears in the above-identified patent and that said Letters Patent are hereby corrected as shown below:

IN THE DRAWINGS:

FIGURES 2B and 7: delete reference numeral "32"

FIGURE 6: change line "8-8" to -- 7-7 --

FIGURE 9: delete reference numeral "32"

FIGURES 10, 11, 12, 13 and 14: change each appearance of reference numeral "32" to -- 34 --.

Signed and Sealed this

Tenth Day of July 1979

[SEAL]

Attest:

*Attesting Officer*

LUTRELLE F. PARKER
*Acting Commissioner of Patents and Trademarks*